United States Patent Office 3,289,467
Patented Dec. 6, 1966

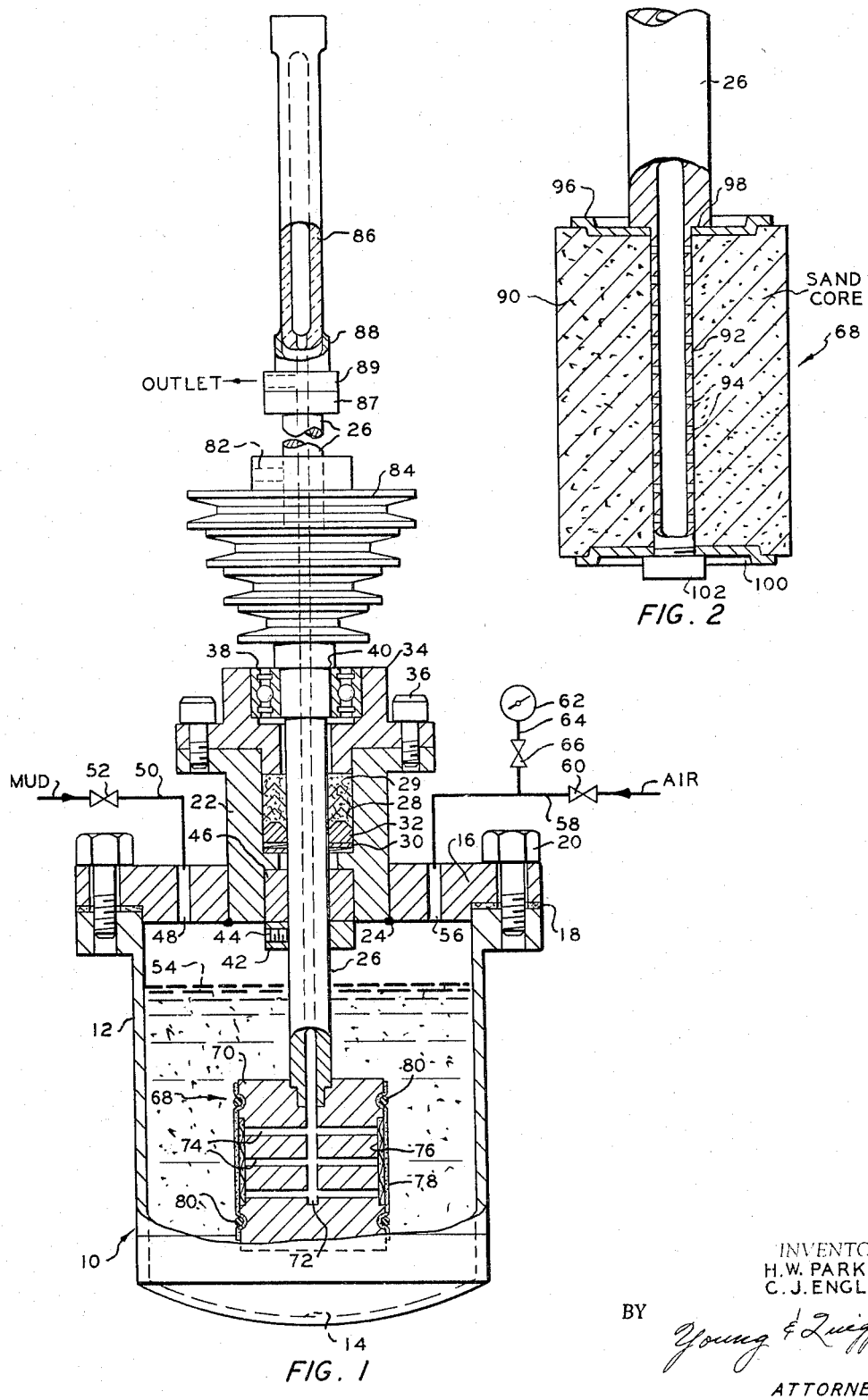

3,289,467
PROCESS AND APPARATUS FOR TESTING
DRILLING MUD CHARACTERISTICS
Harry W. Parker and Charles J. Engle, Bartlesville, Okla.,
assignors to Phillips Petroleum Company, a corporation of Delaware
Filed Mar. 30, 1964, Ser. No. 355,623
14 Claims. (Cl. 73—61.4)

This invention relates to a process and apparatus for determining drilling mud characteristics such as water loss.

The petroleum industry spends large sums of money during drilling operations in seeking new sources of oil to control the fluid loss properties of drilling fluids such as conventional drilling muds. The reasons usually set forth for controlling filtrate loss to the formation thru which the well is being drilled are the effects of drilling fluid filtrate on formation damage, well bore sloughing, core analysis, and log interpretation. It is common practice to treat the drilling fluid with special chemical additives for controlling fluid loss.

In routine testing of drilling muds the standard method for measuring water loss control is filtration of the mud in a static test cell. This method is simple but does not give a true picture of what happens in the well where the mud is flowing past the filtration surface. Several publications discuss the fact that a static filtration test is not adequate to predict the actual behavior in a well. A recent paper entitled "Evaluation of Drilling Fluid Filter Loss Additives Under Dynamic Conditions" by R. F. Krueger has been published as Paper No. SPE 431 of the Society of Petroleum Engineers of AIME, 6300 North Central Expressway, Dallas, Texas. This paper recognizes that some clear water loss additives such as starch may actually increase the dynamic fluid loss of the mud. Measurement of water loss in a dynamic system is very desirable, but apparatus to pump the mud in a circulating loop is complex, as indicated in the paper just referred to.

This invention is concerned with a method and apparatus for measuring dynamic fluid loss of drilling muds which is compact and simple to operate.

Accordingly the principal object of the invention is to provide a process and apparatus for determining drilling mud characteristics under dynamic conditions. Another object is to provide a process and apparatus for measuring liquid loss from drilling muds under simulated well drilling conditions. A further object is to provide a rotary filter for studying drilling mud characteristics under simulated rotary drilling conditions. Other objects of the invention will become apparent to one skilled in the art upon consideration of the accompanying disclosure.

A broad aspect of the invention comprises maintaining a mass of the mud to be tested in an enclosed zone under a substantial pressure, rotating a hollow cylindrical filtering head submerged in the mud, maintaining a pressure difference across the filtering head so as to cause filtrate to pass into the filter head thereby forming a filter cake on the filtering means which is subjected to a shear force by the mud as the filter means is rotated, withdrawing filtrate from the filter means at the rate at which filtrate passes thru same, and measuring the withdrawal rate. The apparatus for the process comprises an upright pressure-sealed mud vessel having positioned therein a rotatable cylindrical filter head on a hollow shaft extending thru the top of the mud vessel, there being passageways in the filter head connecting with an axial bore leading into the hollow shaft. Means is provided on the upper end of the hollow shaft for measuring the amount of filtrate passing thru the filter during any selected period of time. Means is provided on the shaft for rotating the filter head and shaft. An inlet for pressuring fluid or gas is provided in the top of the mud vessel.

A more complete understanding of the invention may be had by reference to the accompanying schematic drawing of which FIGURE 1 is an elevation in partial section of a specific embodiment of the apparatus and FIGURE 2 is an elevation in partial cross section of another embodiment of the filter head for use in the apparatus of FIGURE 1.

Referring to FIGURE 1, a mud vessel 10 in the form of a cylindrical shell 12 is closed at the bottom end by a bottom closure 14 integral with shell 12 and closed at the top end by means of cover 16. Cover 16 is pressure sealed to the upper end of shell 12 by means of gasket 18 and cap screws 20, several of which are positioned around the periphery of cover 16. The bearing housing 22 is axially positioned and fixed to cover 16 by welds 24. A hollow shaft 26 extends from the lower section of mud vessel 10 out thru bearing housing 22 which is provided with a packing gland comprising Chevron packing rings 28, washers 30, ring 32, and pressure cap member 34 which adjustably engages ring 29 so as to apply pressure on the packing rings by means of cap screws 36. Bearing member 38 is housed in the upper end of cap 34 adjacent shoulder 40 on shaft 26. A thrust bearing 42 is fixed on shaft 26 by set screw 44 just below sleeve bearing 46.

Cover 16 is provided with an inlet 48 for introduction of mud thru line 50 containing valve 52. However, it is feasible to operate the device by removing the cover 16 and filling the mud vessel to a suitable level above the filter head described hereinafter, such as at 54, replacing the cover on the vessel in sealed relation thereto and pressuring the mud in the vessel with gas thru gas inlet 56 to which line 58, containing valve 60, is connected. Pressure indicator 62 is made sensitive to the pressure in line 58 thru line 64 with valve 66 open.

The filter head 68 comprises a solid cylinder 70 attached on the lower end of shaft 26 by any suitable means, such as by threads or welding. Cylinder 70, which may be fabricated of metal, plastic, or other suitable material, is co-axial with shaft 26 and is provided with an axial bore 72 which is blind at the lower end and communicates at the upper end with the passageway in shaft 26. A plurality of radial passageways 74 extend from bore 72 thru the periphery of the cylinder. A section of the cylindrical surface of cylinder 70 is recessed for a screen 76 which covers the outer ends of passageways 74. A suitable filter paper or cloth 78 completely covers screen 76 and extends beyond the screen where it is held firmly on the cylinder by means of O-rings 80.

Attached to the upper end of shaft 26 by a set screw 82 is a conventional V-type pulley 84 for driving the shaft and filter head by an electric motor or other means not shown. Shaft 26 above pulley 84 is connected with a pipette or burette or other suitable calibrated glass tube of small bore, designated 86. Tube 86 is protected by a surrounding case or holder 88 attached to base 89 which, in turn, is rotatably attached to shaft 26 by a suitable rotatable joint 87. The passageway thru shaft 26 communicates directly with the bore of burette 86. Burette 86 is calibrated from 0 to 25, 50, or 100 cc. as desired.

Referring to FIGURE 2 the filter head 68 on the lower end of shaft 26 comprises a permeable sand core 90 which has an axial bore thru which a restricted section 92 on the lower end of shaft 26 extends. Section 92 is perforated, having perforations 94 drilled or otherwise formed therein. The upper end of core 90 is provided with a plate or retainer 96 which butts against shoulder 98 on shaft 26. A similar plate or retainer 100 on the opposite end of core 90 is provided and a nut 102 is threaded on the end of section 92 to rigidly fix the core assembly on the shaft.

Core 90 may be an actual sand core from a permeable oil stratum or it may be fabricated from sand with suitable combustible binders and rendered permeable by firing in known manner.

An apparatus was built substantially in accordance with the structure shown in FIGURE 1 utilizing a mud vessel about 7½″ long by 4″ in diameter (internal measurements) and suitable for batch mud testing of about 500 to 750 cc. capacity. Shaft 26 was a ½″ shaft and filter head 68 was 1½″ in diameter by 2 5/16″ in length. The pipette 86 was calibrated from 0 to 50 cc.

In testing the device of FIGURE 1, mud vessel 10 is filled to a suitable level such as at 54 either by removing the cover or by feeding the mud in thru line 50. With the cover in pressure sealed relation to shell 12, nitrogen, air, or other gas is forced into the upper section of the mud vessel thru line 58 until a suitable pressure is reached. This pressure is in the range of 10 to 1000 p.s.i. and preferably 100 to 500 p.s.i. Before pressuring the mud vessel, the liquid channel system including the passageway thru shaft 26 and the passageways in the filter head are filled with water approximately to the 0 level in pipette 86. After pressuring, the electric motor operating pulley 84 is started and the filter head is rotated at a suitable speed in the range of 100 to 600 r.p.m. and the level of liquid in the pipette is observed at regular intervals, as every 5 or 30 minutes or other suitable period, and the filtration rate is readily determined from the number of cc.'s of filtrate passing into the liquid channel in the tester. The filtration thru the filter head is continued until the rate of filtrate passing thru the filter cake on the screen is uniform or has stabilized. After stabilization has been reached, the pressure in the mud vessel is reduced to atmospheric, the cover is removed from the mud vessel, and the filter cake on filter head 68 is studied for mud characteristics.

The usual filtration rate being in the range of 5 to 10 or 15 cc. per hour, recording the liquid level in the pipette or burette 86 at ½ hr. intervals is practiced after the first short period of each run. Any suitable filter paper or cloth may be utilized on the filter head such as Wattman "50" for standard water loss tests.

An alternative practice comprises filling mud vessel with mud thru inlet 48 and maintaining the desired mud pressure in line 50 to pressurize the mud in the mud vessel.

Certain modifications of the invention will become apparent to those skilled in the art and the illustrative details disclosed are not to be construed as imposing unnecessary limitations on the invention.

We claim:

1. Apparatus for filtering drilling mud comprising in combination:
   (a) a stationary or fixed mud vessel having a mud inlet;
   (b) a rotatable shaft extending into said vessel in sealed relation therewith;
   (c) a hollow filter head fixed on said shaft within said vessel and rotatable therewith;
   (d) a longitudinal passageway thru said shaft communicating with said hollow filter head for passage of filtrate from said filter head out of said vessel; and
   (e) means for maintaining a substantial mud pressure in said mud vessel outside of said filter head.

2. The apparatus of claim 1 including means on said shaft outside said vessel for rotating said shaft and means communicating with the passageway thru said shaft for measuring rate of flow of liquid thru said passageway.

3. The apparatus of claim 2 wherein the means of (e) comprises a separate inlet in said vessel for a pressuring fluid.

4. Apparatus comprising in combination:
   (a) an upright stationary cylindrical mud vessel having a cover on its upper end sealed thereto and a mud inlet in said cover;
   (b) an upright hollow rotatable shaft extending thru said cover axially of said vessel in sealed relation therewith;
   (c) a filter head fixed on the inner end of said shaft and rotatable therewith comprising an enlarged cylindrical member coaxial with said shaft having radial passageways connecting with an axial passageway therein leading into said hollow shaft, said axial passageway being blind at the end opposite said shaft, and filtering means covering an annular section of said cylindrical member including the outer ends of said radial passageways; and
   (d) means for rotating said shaft.

5. The apparatus of claim 4 wherein the filtering means of (c) comprises a screen covered with filter material.

6. The apparatus of claim 4 wherein the cover of (a) is firmly attached and sealed to the vessel and said vessel is a high pressure vessel having an inlet for a pressuring fluid.

7. The apparatus of claim 4 including a transparent tube of relatively small bore communicating at its lower end with the upper end of the hollow shaft of (b) and calibrated for volume of filtrate.

8. The apparatus of claim 1 wherein the filter head of (c) comprises a solid cylinder having an axial bore coaxial with the shaft of (b), said bore communicating with the passageway of (d), passageways from said bore to its cylindrical periphery, and filtering means covering said passageways.

9. The apparatus of claim 1 wherein the filter head of (c) comprises a porous cylindrical sand core coaxial with the shaft of (b) and having an axial bore blind at the end remote from said shaft, said bore communicating with the passageway in said shaft.

10. A filter device comprising in combination:
    (a) a hollow shaft;
    (b) a filter head fixed on one end of said shaft and rotatable therewith comprising a cylindrical member of substantially larger diameter than the diameter of said shaft and coaxial therewith;
    (c) an axial passageway in said member, blind at one end and communicating with said hollow shaft at the other end;
    (d) radial passageways extending from said axial passageway thru the periphery of said member;
    (e) a cylindrical screen on the cylindrical surface of said member covering the outer ends of said axial passageways; and
    (f) a filter material covering said screen.

11. The device of claim 10 including means adjacent the end of the hollow shaft of (a) remote from the filter head of (b) for rotating said shaft and a graduated pipette or burette communicating directly with last said end of said hollow shaft for measuring filtrate passing thru said filter.

12. A process for determining the liquid loss rate of drilling mud which comprises:
    (1) maintaining a mass of said mud in an enclosed zone under a substantial pressure;
    (2) rotating a hollow cylindrical filtering head in the mud in said zone;
    (3) maintaining a pressure differential radially across said filtering means so as to cause filtrate to pass radially thru the filter head, thereby forming a filter cake on the cylindrical surface of said filtering means which is subjected to a shear force by the mud as said filter means is rotated;

(4) withdrawing filtrate from said filter means at the rate at which said filtrate passes into said filter means; and (5) measuring said rate.

13. The process of claim 15 wherein the filtrate in step (3) is passed thru a sand core.

14. The process of claim 15 wherein the filtering is continued until a constant rate of filtrate flow is reached as an indication of a stabilized filter cake, and said filter cake is studied for mud characteristics.

References Cited by the Examiner

UNITED STATES PATENTS

| | | | |
|---|---|---|---|
| 2,392,901 | 1/1946 | Brown | 210—416 |
| 2,670,849 | 3/1954 | Dunmire | 210—402 X |
| 2,733,595 | 2/1956 | Twining | 73—53 X |
| 2,733,855 | 2/1956 | McCoy. | |
| 3,055,208 | 9/1962 | Gallus | 73—53 |
| 3,172,286 | 3/1965 | Grubb et al. | 73—53 |

DAVID SCHONBERG, *Primary Examiner.*